(12) United States Patent
Scherer et al.

(10) Patent No.: US 7,784,289 B2
(45) Date of Patent: Aug. 31, 2010

(54) COOLING SYSTEM FOR COOLING HEAT-GENERATING INSTALLATIONS AND FOR MAINTAINING THE TEMPERATURE OF CLOSED-OFF AREAS AT BELOW CABIN TEMPERATURE IN AN AIRCRAFT

(75) Inventors: Thomas Scherer, Hamburg (DE); Matthias Witschke, Hamburg (DE); Ahmet Kayihan Kiryaman, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 104 days.

(21) Appl. No.: 10/584,901

(22) PCT Filed: Dec. 30, 2004

(86) PCT No.: PCT/EP2004/014850

§ 371 (c)(1),
(2), (4) Date: Jan. 11, 2008

(87) PCT Pub. No.: WO2005/063567

PCT Pub. Date: Jul. 14, 2005

(65) Prior Publication Data

US 2008/0134703 A1    Jun. 12, 2008

(30) Foreign Application Priority Data

Dec. 30, 2003  (DE) ................................. 103 61 686

(51) Int. Cl.
*F25D 17/02* (2006.01)
(52) U.S. Cl. ................... 62/99; 62/332; 62/434
(58) Field of Classification Search ............... 62/98–99, 62/175, 332, 430–439
See application file for complete search history.

(56) References Cited

U.S. PATENT DOCUMENTS

| | | | | |
|---|---|---|---|---|
| 3,216,215 A | * | 11/1965 | Schuett | 62/185 |
| 4,189,929 A | * | 2/1980 | Russell | 62/175 |
| 4,233,817 A | * | 11/1980 | Toth | 62/175 |
| 4,487,028 A | * | 12/1984 | Foye | 62/115 |
| 5,220,807 A | * | 6/1993 | Bourne et al. | 62/238.6 |

(Continued)

FOREIGN PATENT DOCUMENTS

DE   3812739 C1   7/1989

(Continued)

OTHER PUBLICATIONS

Forms PCT/ISA/210, 220, 237 International Search Report for PCT/EP2004/014850, mailed on Oct. 3, 2005.

*Primary Examiner*—William E Tapolcai
(74) *Attorney, Agent, or Firm*—Wood, Herron & Evans, L.L.P.

(57) ABSTRACT

In a cooling system (10) for cooling heat-generating installations (44, 46, 48) in an aircraft, with a refrigerating installation (12), at least one refrigeration consumer (44, 46, 48) and a refrigeration transport system (14) connecting the refrigerating installation (12) and the refrigeration consumer (44, 46, 48), it is provided that the refrigerating installation (12) comprises at least one refrigeration machine (18, 20) which covers the maximum refrigeration requirement of the at least one refrigeration consumer (44, 46, 48) and in that the at least one refrigeration consumer (44, 46, 48) is supplied with cold generated in the refrigerating installation (12) via a refrigerating agent circulating in the refrigeration transport system (14).

19 Claims, 1 Drawing Sheet

U.S. PATENT DOCUMENTS

| | | |
|---|---|---|
| 5,491,979 A | 2/1996 | Kull et al. |
| 5,513,500 A | 5/1996 | Fischer et al. |
| 5,671,607 A | 9/1997 | Clemens et al. |
| 5,702,073 A | 12/1997 | Fluegel |
| 5,784,351 A * | 7/1998 | Takagi ........................ 720/647 |
| 6,035,655 A * | 3/2000 | Hare et al. ................. 62/259.2 |
| 6,880,351 B2 * | 4/2005 | Simadiris et al. .............. 62/185 |
| 2003/0042361 A1 | 3/2003 | Simadiris et al. |

FOREIGN PATENT DOCUMENTS

| | | |
|---|---|---|
| DE | 4340317 C2 | 6/1995 |
| DE | 19952524 A1 | 5/2001 |

\* cited by examiner

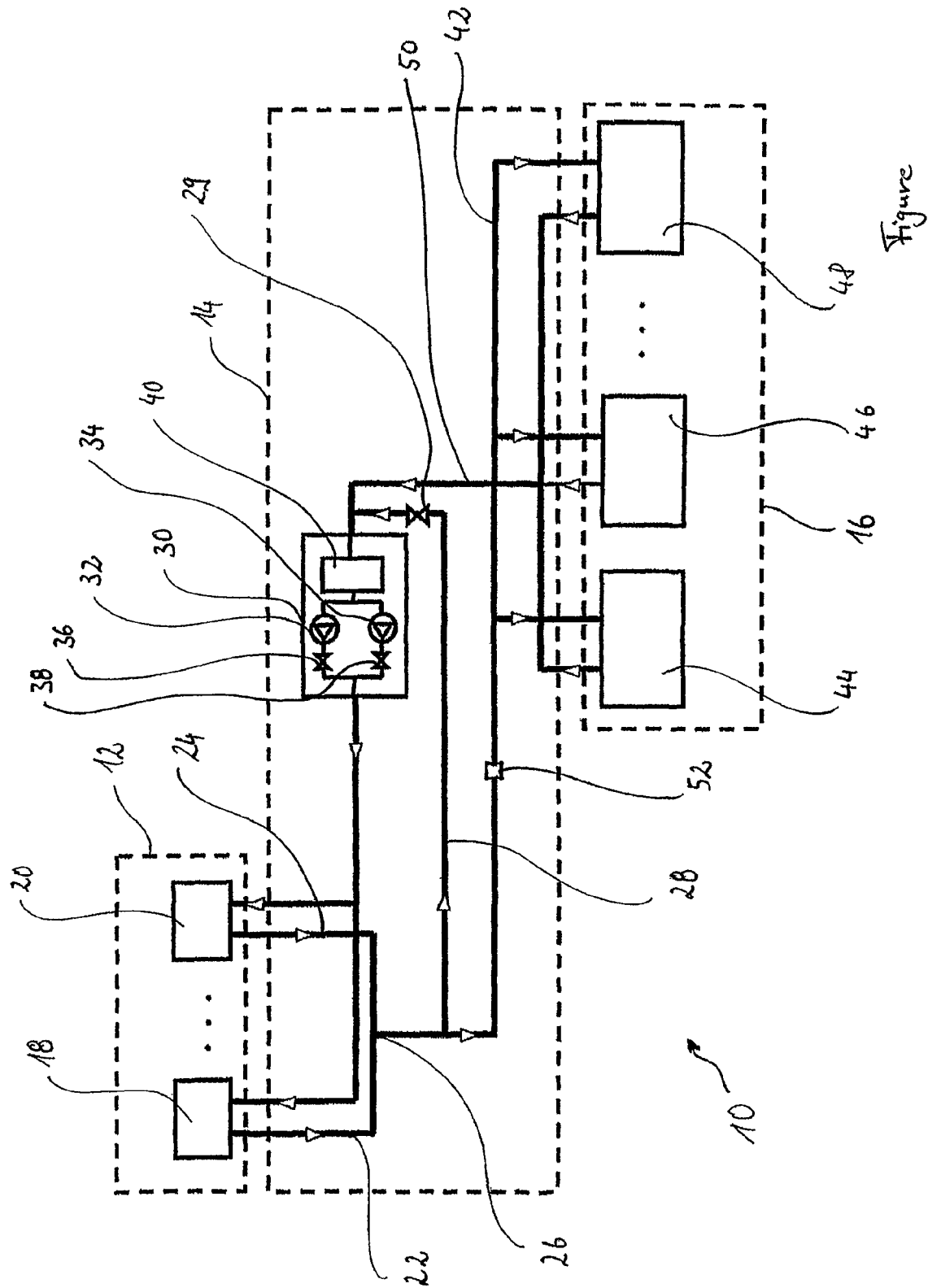
Figure

COOLING SYSTEM FOR COOLING HEAT-GENERATING INSTALLATIONS AND FOR MAINTAINING THE TEMPERATURE OF CLOSED-OFF AREAS AT BELOW CABIN TEMPERATURE IN AN AIRCRAFT

The present invention relates to a cooling system for cooling heat-generating installations and for maintaining the temperature of closed-off areas at below cabin temperature in an aircraft.

In the interior of aircraft a multiplicity of different technical installations is provided which generate heat and must be cooled to guarantee safe functioning. Moreover, there are also various closed-off areas, so-called compartments, in the interior of aircraft which have to be maintained at temperatures below the cabin temperature. Therefore various cooling systems are provided in aircraft.

It is known, for example, from DE 38 12 739 C1 to arrange a cooling chamber inside an onboard kitchen of an aircraft near the outer skin of the aircraft and to provide a cold air chamber between the cooling chamber and the outer skin of the aircraft. In the cold air chamber air is cooled as a refrigerating agent by heat exchange with the outer skin of the aircraft and after the cooling chamber has been cooled fed to cool a service trolley which is, for example, full of drinks or food which need to be cooled. However, this prior art has the disadvantage that a cold air chamber has to be separately assigned to each cooling chamber. This makes the space distribution inside the aircraft relatively inflexible. Moreover, a reliable cooling function can be provided only when the aircraft is flying at great heights in which the environment of the aircraft is very cold. When the aircraft is on the ground after landing, the cooling functions can be guaranteed only by an additional cold store, the refrigeration capacity of which is limited.

A cooling system for cooling food in an aircraft is known from patent specification DE 43 40 317 C2. In this cooling system a central refrigerating installation is provided in an aircraft, which conveys refrigerating agent to individual heat exchanger units via a pipe system. The heat exchanger units are coupled via additional pipes to transport containers to be cooled in the region of storage places of an onboard kitchen. The transport containers contain the food to be cooled in each case. This cooling system requires the laying of various pipe systems and is therefore relatively expensive to construct.

A similar cooling system is known from US 2003/0042361 A1.

One object of the present invention is to provide a cooling system of the kind initially designated, which, with a simple construction, has a large amount of flexibility in respect of the installation and good matching to the current refrigeration requirement.

This object is achieved by a cooling system for cooling heat-generating installations in an aircraft, constructed with a refrigerating installation, at least one refrigeration consumer and one refrigeration transport system connecting the refrigerating installation to the refrigeration consumer, the refrigerating installation comprising at least one refrigeration machine which covers the maximum refrigeration requirement of the at least one refrigeration consumer and the at least one refrigeration consumer being supplied with cold generated in the refrigerating installation via a refrigerating agent circulating in the refrigeration transport system.

According to the invention the refrigeration capacity of the cooling system can therefore be set depending on the current requirements by specific activation of the refrigerating installation. In this way the efficiency of the cooling system can be increased, as the cooling system can also be operated at low capacity in particular if only a low refrigeration capacity is required, whereas, if a high refrigeration capacity is needed the cooling system can be operated at a correspondingly high capacity. This ultimately results in optimised consumption of electrical energy for operating the refrigerating installation, as well as reduced fuel consumption of the aircraft and increased life of the refrigerating installation.

A further development of the invention provides that the refrigerating installation has at least two refrigeration machines which operate independently of one another and are coupled to the refrigeration transport system in parallel. In this way, on the one hand the maximum refrigeration capacity of the refrigerating installation is increased and on the other hand greater reliability of the cooling system is achieved, since the cooling system is still capable of providing a minimum refrigeration capacity by the at least one further refrigeration machine even if one of the refrigeration machines fails. According to a variant of the invention the number of refrigeration machines of the refrigerating installation is preferably chosen in such a way that the refrigeration requirement of the aircraft is covered during operation on the ground, in which there is a considerably higher outside temperature round the aircraft than during flight operation at great heights.

In an embodiment variant of the invention it is provided that the at least one refrigeration machine generates refrigeration by a cold vapour process. A cold vapour process provides the possibility of generating cold at moderately low temperatures with relatively low technical outlay.

In order to be able to guarantee reliable transport of refrigerating agent between the at least one refrigeration consumer and the refrigerating installation via the refrigeration transport system, a further development of the invention provides that the refrigeration transport system has at least one refrigerating agent pump for circulating the refrigerating agent.

It can further be provided according to the invention that the refrigeration transport system has at least one store for intermediate storage of refrigerating agent. By means of this store thermally caused changes in volume of the refrigerating agent and leakages in the refrigeration transport system can be compensated to a certain extent.

A further development of the invention provides that the at least one refrigeration consumer has a secondary refrigeration transport system in which cold is transmitted from the refrigerating agent by means of a secondary refrigerating agent, preferably air. This principle for achieving the object is applied, for example, in an onboard kitchen of the aircraft. In this case a kitchen air cooler is used to transmit the cold from the refrigerating agent to the air used as secondary refrigerating agent and to cool food and drinks, for example, with this cooled air.

An advantageous further development of the invention provides that a central control unit is provided which controls the refrigeration capacity depending on at least one parameter indicating the current refrigeration requirement. In this connection it can further be provided according to the invention that the parameters indicating the current refrigeration requirement reproduce the temperature of the refrigerating agent at at least one point in the refrigeration transport system, preferably at least the outflow temperature of the refrigerating agent from the refrigerating agent pump, or/and information on the refrigeration requirement of the at least one refrigeration consumer or/and the pressure of the refrigerating agent in the refrigeration transport system.

When "control" is mentioned in connection with this description of the invention, this is intended on the one hand to include the case where individual components of the cooling system are controlled according to preset characteristic curves without feedback. On the other hand this expression is also intended to include the case where components are activated as fed back, i.e. in the sense of automatic control.

As already alluded to above, it is possible according to the invention to set the refrigeration capacity depending on the current requirements. So, for example, in a further development of the invention it is provided that the refrigeration capacity can be controlled to match the current refrigeration requirement in the aircraft by switching on and off individual refrigeration machines of the refrigerating installation. In other words, where a small refrigeration capacity is required only one refrigeration machine is operated, for example, and when there is a temporarily required increase in the refrigeration capacity at least one further refrigeration machine is additionally activated. In order to load all the refrigeration machines employed in the cooling system approximately equally, a further development of the invention provides that the central control unit activates the refrigeration machines in such a way that on average in terms of time they have substantially the same length of operation.

Alternatively to activating the refrigeration machines via a central control unit, a decentralised mode of procedure is also possible. For example, the status of all the refrigeration machines present in the aircraft can be extracted via a databus. After a predetermined prioritisation the refrigeration generators can be automatically activated. Prioritisation of this kind can be time-dependent, for example. For instance, with this embodiment variant of the invention it is possible for the individual refrigeration machines also to alternate in their order of activation. For example, a refrigeration machine which was activated relatively late in a preceding cooling cycle in comparison to other refrigeration machines, may be switched on earlier, for example as the very first, in a subsequent cooling cycle. This measure also allows the load to be distributed on average in terms of time equally over the individual refrigeration machines.

In one variant of the invention it can be provided that the refrigerating agent flows through both a switched off refrigeration machine and a switched on refrigeration machine. In this way the mixed temperature of the refrigerating agent is raised in the flow pipes. It is, however, equally possible for a shut-off valve to be assigned to each refrigeration machine. This can prevent the refrigerating agent flowing through a switched off refrigeration machine and the mixed temperature of the refrigerating agent being raised in the flow pipes.

Alternatively to the case depicted above of switching on refrigeration machines according to requirement, a further development of the invention provides that the refrigeration capacity of the at least one refrigeration machine is controllable, preferably continuously, by means of the control device. In this connection it can be provided, for example, that the control unit detects the outflow temperature of the refrigerating agent leaving the refrigeration machine and activates the refrigeration machine in accordance with the detected outflow temperature. In an alternative embodiment according to the invention it is provided that the refrigeration capacity of the at least one refrigeration machine can be altered, for example by varying the speed of a compressor used in the refrigeration machine.

Additionally or alternatively to the possibilities for influencing the refrigeration capacity depicted above, it is also possible according to the invention that to control the refrigeration capacity of the cooling system the control unit alters the amount of refrigerating agent conveyed in the refrigeration transport system. Depending on the refrigeration capacity required, accordingly more or less refrigerating agent is conveyed from the refrigerating installation to the at least one refrigeration consumer via the refrigeration transport system. This can be done, for example, in that to control the refrigeration capacity the control unit alters the speed of the at least one refrigerating agent pump.

An embodiment example of the present invention is explained below using the attached figure, in which a cooling system according to the invention is schematically illustrated.

In the attached figure a cooling system according to the invention is generally designated by 10. It comprises a refrigerating installation 12, a refrigeration transport system 14 and a region 16 in which cold is consumed.

The refrigerating installation 12 has two refrigeration machines 18 and 20, in which a refrigerating agent is cooled via a cold vapour process generally known in thermodynamics and is conducted into the refrigeration transport system 14 via two parallel pipes 22 and 24. In the refrigeration transport system 14 the two parallel pipes 22 and 24 meet at a point 26. Refrigerating agent is conveyed to a pump unit 30 via an optional conveying pipe 28 provided with a separately activatable shut-off valve 29. The pump unit 30 has two pumps 32 and 34, switched parallel to one another, and to which separately activatable shut-off valves 36 and 38 are assigned. A refrigerating agent intermediate store 40 is connected upstream the parallel circuit of the pumps 32 and 34 in the pump unit 30. The intermediate store serves to compensate the volume in the event of thermal expansion effects and leakage effects.

Because of the circulating effect of the pump unit 30, cooled refrigerating agent is conveyed to various refrigeration consumers 44, 46 and 48 via a feed pipe 42. The refrigeration consumers 44, 46 and 48 are, for example, functional units in an onboard kitchen of an aircraft which need to be cooled, such as, for example, a cooling chamber full of food and drinks, or computer units which need to be cooled during operation or a video system of the aircraft.

The cooled refrigerating agent is fed to the refrigeration consumers 44, 46, 48 from the feed pipe 42 via single pipes in each case. The refrigerating agent is heated in each of the refrigeration consumers 44, 46, 48, i.e. it absorbs heat from them. Put another way, the refrigerating agent gives off its "cold" to the refrigeration consumers 44, 46, 48. Accordingly heated refrigerating agent is then conducted back to the refrigeration machines 18 and 20 of the refrigerating installation 12 through the refrigeration transport system 14 via a feedback pipe 50 by means of the pump unit 30. There the meanwhile heated refrigerating agent is cooled again and can be conducted back into the refrigeration transport system 14 again via pipes 22 and 24.

The cooling system can be differently laid out and activated depending on the size of the aircraft and depending on the refrigeration requirement inside the aircraft. It is therefore possible, for example, where a relatively large refrigeration requirement is expected to provide more refrigeration machines, which can then be switched on according to requirement, i.e. in operating situations of high refrigeration requirement, and in operating situations of low refrigeration requirement can be switched to an idle state or completely switched off. It is also possible to continuously control the refrigeration capacity of one of the refrigeration machines 18 and 20 for example by varying the speed of the compressor used in the refrigeration machine. Additionally or alternatively to this it is possible in the event of high refrigeration requirement to switch the shut-off valve 29 into a locked position, so that the entire cooled refrigerating agent is fed to the refrigeration consumers 44, 46, 48 via the feed pipe 42. In an operating state of low refrigeration requirement, on the other hand, the shut-off valve 29 is opened, so that part of the cooled refrigerating agent is already conveyed back to the refrigeration machines 18 and 20 via the pump unit 30.

A further possibility for influencing the refrigeration capacity of the cooling system 10 consists of actuating the circulating pumps 32 and 34 according to requirement. Therefore one variant of the invention provides that the speed of the pumps 32 and 34 can be altered continually and therefore the conveying capacity of the pumps 32 and 34 can also be altered within certain limits.

With the cooling system 10 it is further possible specifically to open or close the shut-off valves 36 and 38 assigned to the pumps 32 and 34 depending on the current refrigeration capacity requirement. This means that the valve position of the shut-off valves 36 and 38 can be continually altered between a completely open position and a completely closed position. The same applies to shut-off valve 29. This also allows the volume conveyed by the refrigeration transport system to be specifically set.

Activating the pumps 32 and 34 and the shut-off valves 29, 36, 38 can be done, for example, depending on pressure measured values, measured at various points within the refrigeration transport system 14, for example by a sensor 52 in pipe 42.

Furthermore, each of the consumers 44, 46, 48 can have a temperature sensor, the variously activatable components of the system, such as the refrigeration machines 18, 20, the pumps 32 and 34 and the individual shut-off valves 29, 36 and 38 being able to be controlled depending on the temperatures measured in the consumers 44, 46 and 48. For the person skilled in the art it goes without saying that parameters of the refrigerating agent, such as temperature, pressure, flow speed, etc., can also be measured at a multiplicity of further points within the cooling system 10 and the above mentioned activatable components of the cooling system 10 can be controlled using the measured values.

The invention shows a cooling system 10 with which a multiplicity of different refrigeration consumers 44, 46, 48 can be cooled centrally with refrigerating agent cooled to an adequate strength for the purpose of secure and reliable operation, wherein the refrigeration capacity of the cooling system 10 can be matched to the current refrigeration requirement. In this way the efficiency in partial load operation, i.e. with relatively low current refrigeration requirement, can be increased. Ultimately this leads to lower consumption of electrical energy inside the aircraft, which also entails reduced fuel consumption of the aircraft. Moreover, it can be achieved with the cooling system 10 according to the invention that the refrigeration machines 18, 20 employed are not only in continuous operation, but can optionally be switched off according to requirement. This can appreciably lengthen their serviceable life.

The invention claimed is:

1. Cooling system (10) for cooling heat-generating installations (44, 46, 48) and for maintaining the temperature of closed-off areas at below cabin temperature in an aircraft, the cooling system comprising:
    a refrigerating installation (12) in the aircraft, including at least two refrigeration machines (18, 20) which operate independently of one another in parallel;
    at least one refrigeration consumer (44, 46, 48) constructed as a heat generating installation or as an area to be maintained at a temperature below cabin temperature;
    a refrigeration transport system (14) connecting the refrigerating installation (12) and the refrigeration consumer (44, 46, 48); and
    a central control unit operatively coupled to the refrigerating installation (12) and controlling the refrigeration capacity of the at least two refrigeration machines (18, 20) depending on at least one parameter indicating the current refrigeration demand, such that each of the at least two refrigeration machines (18, 20) operates, on the average, for substantially the same amount of time,
    wherein the refrigerating installation (12) covers the maximum refrigeration requirement of the at least one refrigeration consumer (44, 46, 48),
    wherein the at least one refrigeration consumer (44, 46, 48) is supplied with cold generated in the refrigerating installation (12) via a refrigerating agent circulating in the refrigeration transport system (14),
    wherein a conveying pipe (28) having a shut-off valve (29) is provided, the shut-off valve (29) opening to feed at least a portion of the refrigerating agent from the refrigerating installation (12) by bypassing the at least one refrigeration consumer (44, 46, 48) directly to a pump unit (30) and back to the refrigerating installation (12), the shut-off valve (29) closing to force all of the refrigerating agent from the refrigerating installation (12) to the at least one refrigeration consumer (44, 46, 48), the shut-off valve (29) thereby controlling a refrigeration output of the cooling system based on a changing refrigeration requirement.

2. Cooling system (10) according to claim 1, characterised in that the number of refrigeration machines (18, 20) of the refrigerating installation (12) is chosen in such a way that the refrigeration requirement of the aircraft is covered during ground operation.

3. Cooling system (10) according to claim 1, characterised in that at least one refrigeration machine (18, 20) uses air inside the pressurised fuselage of the aircraft as a heat sink for emitting heat.

4. Cooling system (10) according to claim 1, characterised in that at least one refrigeration machine (18, 20) generates cold by a vapour cycle refrigeration process.

5. Cooling system (10) according to claim 1, characterised in that the refrigeration transport system (14) has at least one refrigerating agent pump (32, 34) for circulating the refrigerating agent.

6. Cooling system (10) according to claim 1, characterised in that the refrigeration transport system (14) has at least one store (40) for compensating for thermal expansion and leakage losses of the refrigerating agent.

7. Cooling system (10) according to claim 1, characterised in that the at least one refrigeration consumer (44, 46, 48) has a secondary refrigeration transport system in which cold is transmitted from the refrigerating agent by means of a secondary refrigerating agent.

8. Cooling system (10) according to claim 1, characterised in that the parameters indicating the current refrigeration demand reproduce the temperature of the refrigerating agent at at least one point in the refrigeration transport system (14) or/and information on the refrigeration demand of the at least one refrigeration consumer (44, 46, 48) or/and the pressure of the refrigerating agent in the refrigeration transport system (14).

9. Cooling system (10) according to claim 1, characterised in that the refrigeration capacity is controllable by switching on and off individual refrigeration machines (18, 20) of the refrigerating installation (12) to match the current refrigeration demand in the aircraft.

10. Cooling system (10) according to claim 1, characterised in that the refrigeration machines are controlled in decentralised manner, in particular by an automatic and time-dependent activation based on a monitoring of the actual status of all refrigeration machines via a databus.

11. Cooling system (10) according to claim 10, characterised in that the refrigeration machines are activatable according to a predetermined prioritisation.

12. Cooling system (10) according to claim 1, characterised in that the refrigerating agent flows through both a switched on refrigeration machine (18, 20) and a switched off refrigeration machine, 13. Cooling system (10) according to claim 1, characterised in that a shut-off valve is assigned to each refrigeration machine.

14. Cooling system (10) according to claim 1, characterised in that the refrigeration capacity of the at least one refrigeration machine (18, 20) is controllable by means of the control device.

15. Cooling system (10) according to claim 1, characterised in that the control unit detects the outflow temperature of the refrigerating agent leaving the refrigeration machine (18, 20) and activates the refrigeration machine (18, 20) in accordance with the detected outflow temperature.

16. Cooling system (10) according to claim 15, characterised in that the refrigeration capacity of the at least one refrigeration machine (18, 20) can be altered by means of a hot gas bypass valve and/or by varying the speed of a compressor used in the refrigeration machine (18, 20).

17. Cooling system (10) according to claim 1, characterised in that to influence the refrigeration capacity of the cooling system (10) the control unit alters the amount of refrigerating agent conveyed in the refrigeration transport system (14).

18. Cooling system (10) according to claim 17, characterised in that to influence the refrigeration capacity the control unit alters the speed of the at least one refrigerating agent pump (32, 34).

19. Method of cooling heat generating installations in an aircraft, the method comprising:

coupling at least two refrigeration machines in parallel to a refrigeration transport system in the aircraft, the two refrigeration machines being configured to cover the maximum refrigeration requirement of the heat generating installations;

delivering cold refrigerant agent through the refrigeration transport system to the heat generating installations;

conveying at least a portion of the cold refrigeration agent from the refrigeration transport system through a bypass pipe having a shut-off valve leading back to a pump unit and the at least two refrigeration machines, the shut-off valve opening and closing to control a refrigeration output of the cooling system based on a changing refrigeration requirement; and controlling the at least two refrigeration machines to operate for an equal amount of time on average.

* * * * *